Aug. 13, 1940.  A. IVANCIN  2,211,014
KNIFE GRINDING MACHINE
Filed Nov. 28, 1938   3 Sheets-Sheet 1
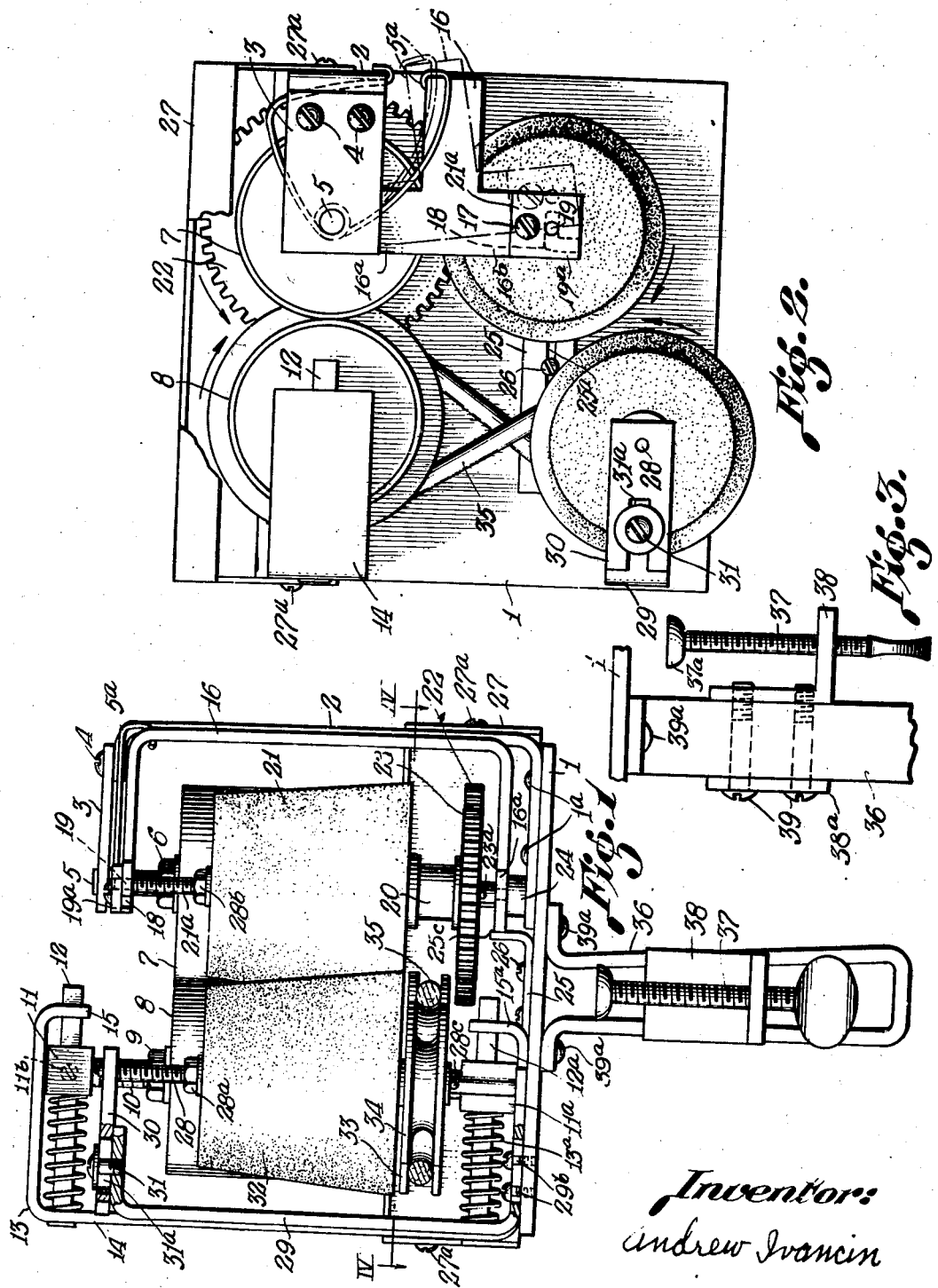
Inventor:
Andrew Ivancin

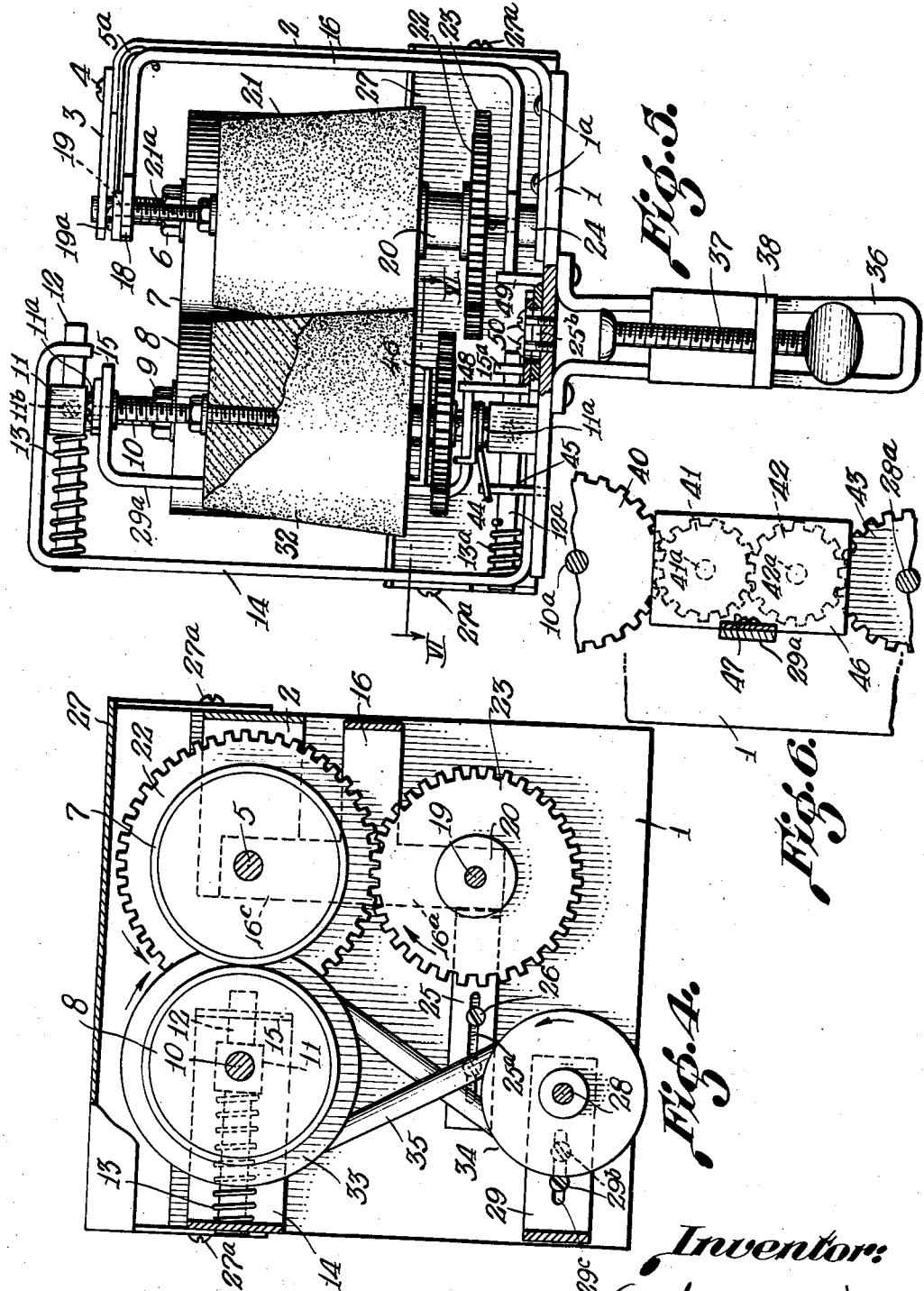

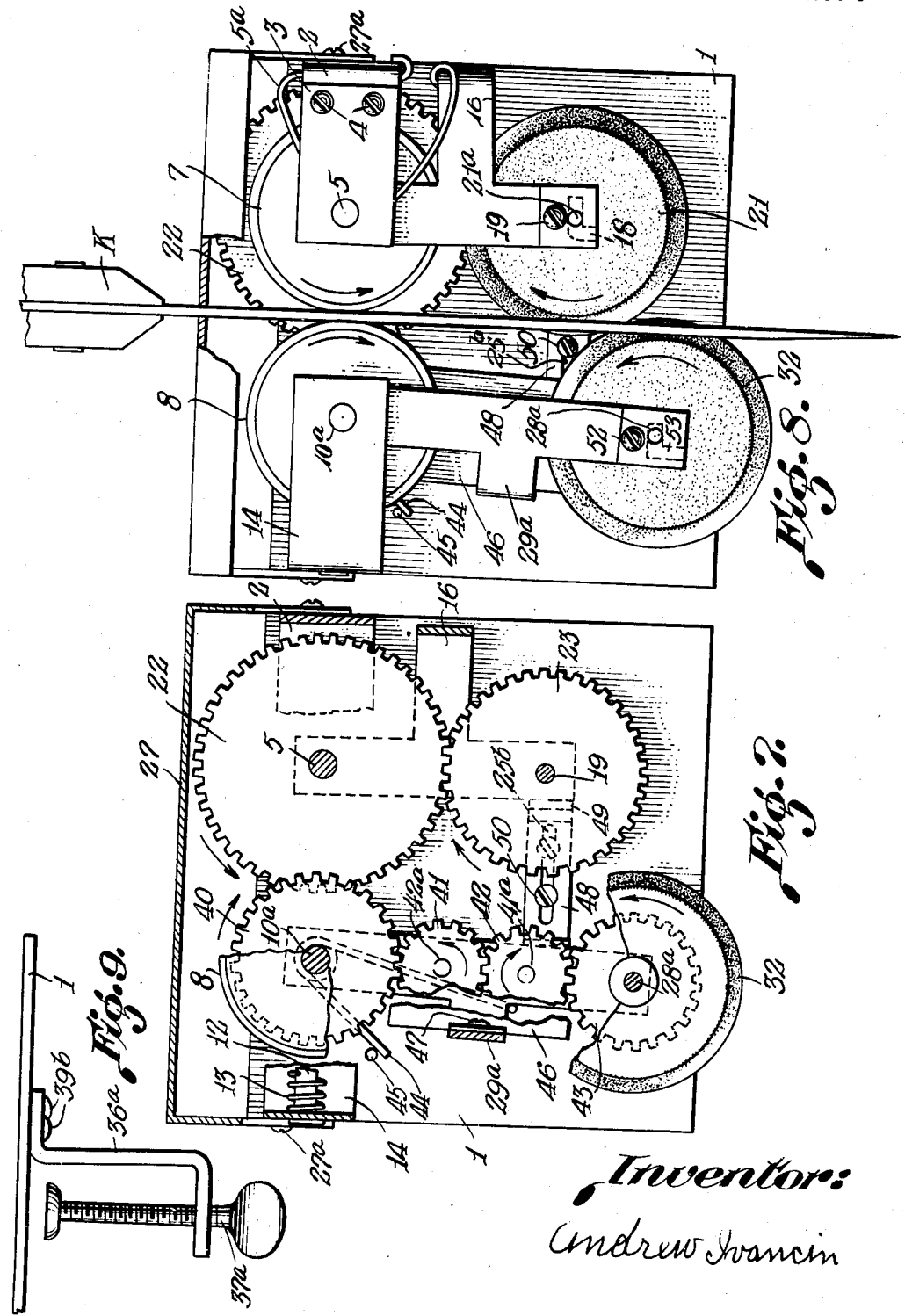

Patented Aug. 13, 1940

2,211,014

UNITED STATES PATENT OFFICE 2,211,014

KNIFE GRINDING MACHINE

Andrew Ivancin, Chicago, Ill.

Application November 28, 1938, Serial No. 242,792

3 Claims. (Cl. 51—80)

This invention relates to knife grinding machines and more particularly to a manually operated knife grinding machine adaptable for household and commercial purposes, although certain features thereof may be employed with equal advantage for kindred purposes.

While there are any number of knife grinding mechanisms of the manual type in commercial use today, so far as it is presumably known, none have been thus far proposed in which the abrading wheels are actuated responsive to the reciprocatory displacement of the knife blade between guide rollers without requiring additional driving mechanism therefor, such as crank handles and the like. With the teachings of the present invention, an improved durable, efficient and comparatively inexpensive knife grinding machine is provided which is simple in operation in that it is self-adjustable for controlled grinding and sharpening of various types of knife blades, accomplishing the desired result with only a comparatively few guided reciprocal strokes of the knife.

One object of the present invention is to provide a knife grinding machine of improved, durable construction.

Another object is to provide an improved manually operated knife grinding machine which is simple and efficient in operation.

Still another object is to provide an improved manually operated knife grinding machine for household and commercial use which is automatically self-adjustable to effectively grind and sharpen cutlery.

A further object is to provide an improved manually operated knife grinding machine in which the grinding mechanism revolves in an opposite direction to the knife stroke responsive to the reciprocatory motion thereof.

Other objects and advantages will appear from the following description of an illustrative embodiment of the present invention.

In the drawings:

Figure 1 is a front view in elevation of the knife grinding mechanism embodying features of the present invention with a portion thereof being shown partially in section to clarify the showing.

Figure 2 is a top plan view of Figure 1.

Figure 3 is a fragmentary side view in elevation of the clamp arm shown in Figure 1 for supporting the device by engagement with a stationary support.

Figure 4 is a sectional view taken substantially along lines IV—IV of Figure 1.

Figure 5 is a front view in elevation of a modified embodiment of the present invention with portions thereof being shown in section to clarify the showing.

Figure 6 is a fragmentary sectional view taken substantially along line VI—VI of Figure 5.

Figure 7 is a top plan view of Figure 5 with fragmentary portions thereof being shown in partial section or removed to show the gear arrangement comprising the driving mechanism.

Figure 8 is a top plan view of Figure 5 showing a knife blade positioned in the mechanism for grinding and sharpening thereof.

Figure 9 is a side view in elevation showing a modification of the clamp arm shown in Figure 5.

The structure selected for illustration comprises a flat steel base plate 1 of substantially square configuration having two substantially L-shaped bracket members 2—29 extending vertically therefrom for rigid attachment to diagonally opposite corner surfaces thereof by means of rivets, metal screws, threaded bolts or other suitable fastener expedients 2ª—29ª, respectively. Bracket member 2 is formed into a substantially U-shaped configuration by attachment of a short extension plate 3 thereto with metal screws 4 so as to confront the extended base thereof in parallel relation, for reasons that will appear more fully hereinafter. A third bracket member 14 of substantially U-shaped configuration having oppositely disposed flanged extremities 15—15ª is similarly attached to base plate 1 so as to confront bracket 2 in the same vertical plane at the rear of said base plate. A fourth bracket member 16, also substantially U-shaped in configuration, is positioned forwardly of bracket member 2 for pivotal mounting relative thereto by means of vertical shaft 5 projected through vertically aligned apertures in horizontal extensions 16ª (Figure 2) and 16ᶜ (Figure 4) of bracket 16. Shaft 5 is fixedly mounted in extension plate 3 of bracket 2 and lower aligned bearing 24 attached to the base thereof. It should be noted that bracket extension plate 3 is detachably associated with bracket 2 so that shaft 5 may be retained in assembled relation with bracket 2 through fixed registry with plate 3 attached to upper end of bracket 2 by means of metal screws 4.

In order that bracket 16 may be limited in range to a fixed pivotal arc, a flat plate 25 having an elongated slot 25ª therein and a short upwardly extending flange 25ᶜ, is adjustably fastened to base plate 1 by means of metal screws 26 projected through slot 25ª. Plate 25 is positioned on base plate 1 so that flange 25ᶜ thereof will be in the arcuate path normally defined by bracket 16 in pivoting about its fulcrum 5. In consequence thereof, flange 25ᶜ serves as a stop against which horizontal extension 16ᵇ of bracket 16 will abut, thus limiting the arcuate swing of said bracket, for reasons that will appear more fully hereinafter.

It is worthy of note that elongated slot 25ª permits the adjustable positioning of plate 25 so as to effectively lengthen or reduce the arcuate path of bracket 16, which is further limited in the counterclockwise direction (viewed from Figure 2) by the abutment of said bracket against the confronting corner of stationary bracket 16. An angular wire spring member 5ª having an intermediate coil surrounding shaft 5, normally urges the bracket 16 in a clockwise direction (viewed from Figure 2) against the stop 25ᵇ.

Bracket members 14—16—29 serve as supports for vertical shafts 10—19—28, respectively mounted therein, to be more fully described infra. Shaft 10 is journalled in bearing blocks 11—11ª transversely apertured to receive rectangular bars 12—12ª therethrough. Bearing blocks 11—11ª are respectively maintained at any desired position along the lengths of bars 12—12ª by means of set screws 11ᵇ horizontally projected through recesses in said bearing blocks to frictionally engage the confronting surfaces of bars 12—12ª. Coil springs 13—13ª are confined between bearing blocks 11—11ª, respectively, and bracket 14 in enveloping relation with reciprocally mounted bars 12—12ª so as to normally urge vertical shaft 10 and the various instrumentalities mounted thereon toward stationary vertical shaft 5 journalled in bracket member 2.

Threaded shafts 5—10 are provided with leather encased cylindrical guide rollers 7—8 respectively journalled thereon for yieldable contact therebetween along a vertical tangential plane to constitute a defined path of travel for any knife blade K (Figure 8) inserted between the co-acting rollers 7—8. Obviously, yieldable contact between said guide rollers is effected by the normal urging of roller 8 on shaft 10 toward roller 7 through the influence exerted by coil springs 13—13ª, as described supra. It should be noted that said spring force is such that insertion of a knife blade between rollers 7—8 will cause said rollers to rotate toward each other and in the same direction as the knife responsive to the displacement of said knife therethrough. Nuts and washers 6—9 are turned down the threaded portion of shafts 5—10 to confront the upper end of rollers 7—8, to the end that said rollers may be threadedly engaged in fixed position on their respective shafts, thus precluding vertical displacement along the lengths thereof.

Inserting the knife blade K horizontally between leather encased guide rollers 7—8 until further movement is precluded by the abutment of the knife handle against said rollers before reciprocally withdrawing the knife blade in order to impart an oscillatory motion thereto, will cause said knife blade to advance between a pair of frusto-conical abrasive rollers 21—32 disposed in the path thereof and threadedly engaged for rotation with threaded vertical shafts 19—28, respectively. It is to be noted that shafts 19—28, freely journalled in brackets 16—29, respectively, are positioned on opposite sides of the longitudinal median line of base plate 1 and are out of transverse alignment.

To this end, shaft 28 is supported forwardly of shaft 19 in vertically aligned apertures in base of bracket 29 and upper horizontal extension plate 30. Extension plate 30 is slidably associated with said bracket by means of threaded bolt and washer 31 registered in transverse slot 31ª, thereby affording adjustment of abrasive roller 32 for more effective grinding and sharpening action. A further adjustment may be effected by moving bracket 29 transversely relative to bracket 16. For this purpose, the base of bracket 29 is provided with an elongated slot 29ᶜ for slidable positioning thereof. As shown, shaft 19 is journalled in lower extension 16ᵈ of pivoting bracket 16, while the upper end thereof projects through an angular slot 18 cut in upper extension 16ᵇ of said bracket.

In order to maintain shaft 19 in the desired vertical position, the end of said shaft is confined within slot 18 by registering with an aperture in plate 19ª attached to extension 16ᵇ with metal screw 17. The abrasive rollers 21—32 formed of suitable abrasive material, as dictated by commercial practice, are disposed by reason of their respective shafts 19—28, one in advance of the other with their adjacent lower ends projecting past each other, so as to impart an abrasive grinding and sharpening action to the depending cutting edge of the knife blade K inserted between co-acting guide rollers 7—8 and displaced along the path of travel defined thereby.

It should be noted that the displacement of the knife blade K between guide rollers 7—8, and the rotary movement imparted to said rollers, thereby, results in the simultaneously responsive but oppositely directed partial rotation of abrasive rollers 21—32 by means of actuating mechanism to be described hereinafter. Thus the desired abrasive action is imparted to the knife blade K when displaced between the rotatably mounted abrasive rollers 21—32. By positioning stationary abrasive roller 32 slightly in advance of yieldably mounted abrasive roller 21, said rollers will properly engage the opposite faces of knife blade cutting edge K irrespective of the varying sizes thereof or the wear on said rollers.

Furthermore, the pitch of rollers 21—32 is such that a thin knife blade will receive the desired abrasive action near the upper surfaces of said rollers, while thicker knife blades requiring more surface sharpening will be subjected to the grinding operation along a lower portion of the rollers where more abrasive surface is brought into contact. It should be apparent, therefore, that reciprocal displacement of the knife blade between the forward abrasive rollers 21—32 will effectively produce the desired sharpening of the cutting edge of said knife in that said rollers will readily adapt themselves to blades of varying thickness and will also be held in yieldable contact therewith. Should it be desirable to sharpen the cutting edge of a knife blade K adjacent the handle thereof, said knife blade may be readily inserted between rollers 21—32 from the forward end of the device so as to subject the knife blade to the abrasive action for the entire length thereof.

To obtain the proper abrading action, the abrasive rollers 21—32 should be rotated in a direction opposite to the movement of the knife K. To accomplish this, interconnected actuating mechanism is provided on the pairs of vertical shafts 5—19 and 10—28. A spur gear 22 mounted on shaft 5 between guide roller 7 and bearing 24, is connected to roller 7 by means of a spacer collar (not shown) which may be integrally formed with said gear and suitably fixed to shaft 5 for rotation therewith. Gear 22 meshes with pinion 23 similarly mounted on shaft 19, said pinion having a spacer collar or hub extension 20 connected to abrasive roller 21 and being fixedly attached to shaft 19 by means of pin 23a for rotation therewith.

Obviously, rotation of roller 7 in a counter-clockwise direction (viewed from Figure 2) will result in rotating roller 21 in the opposite or clockwise direction and at a higher rate of speed. A nut and washer 28b turned down the threaded portion of shaft 19 securely mounts rollers 21 on said shaft, thus precluding vertical displacement of roller 21 along said shaft. A nut and washer 28a turned down threaded shaft 28 accomplishes the same result for roller 32. On the underside of shaft 10, pulley 33 fixedly mounted between roller 8 and bearing block 11a for rotation with said shaft, is reversely connected to a smaller pulley 34 similarly mounted on shaft 28 by means of belt 35 confined in horizontally aligned grooves in said pulleys. As shown, belt 35 is reversed between pulleys 33 and 34 so that rotation of shaft 10 in a clockwise direction (viewed from Figure 2) will result in rotating shaft 28 in the opposite direction and at a higher rate of speed.

A pin 28c maintains pulley 34 in a fixed plane on shaft 28. A guard plate 27 extending vertically for a distance above base plate 1 is provided at the rear of said base plate for attachment to bracket members 14 with metal screws 27a. As shown in Figure 1, guard plate 27 is slotted sufficiently to permit clearance for the transverse reciprocation of rod 12 therethrough. In order that the grinding device may be conveniently held or rigidly clamped to a flat surface such as a table edge or other surface (not shown), a handle member 36, in this instance formed by reversely bending a metal bar, is fastened to the underside of base plate 1 with suitable fasteners such as bolts, rivets or screws 39a so as to depend vertically therefrom.

Intermediate the length of handle member 36, a clamp arm comprising two oppositely disposed plates 38—38a and a vertical thumb screw 37, is fastened to said handle member by means of threaded bolts 39. Thumb screw 37 having a flanged extremity 37a for clamping engagement with a flat ledge surface held between said flange and the underside of base plate 1, is threadedly projected through the horizontal portion of angle bracket 38.

In the modified embodiment shown in Figures 5 to 9 inclusive, the parts and shapes of the members are substantially identical with those described in the preferred embodiment. However, bracket member 29a corresponding to bracket 29 in the preferred embodiment is, in this instance, shaped similar to bracket 16 for pivotal mounting with vertical shaft 10a acting as a fulcrum therefor. Shaft 10a is journalled in vertically aligned apertures provided in upper and lower horizontal extensions of bracket 29a. Upper end of shaft 28a is received through an angular slot provided in bracket 29a and is anchored in vertical alignment within said slot by registry with a perforation in extension plate 53 fastened to said bracket by screw 52.

In order that the arcuate paths normally defined by bracket members 16—29a in pivoting about their respective fulcrums 5—10a may be limited to any desired length, flat plates 48—49, having short upstanding flanges serving as stops are adjustably fastened to base plate 1 in transverse superimposed relation. Aligned transverse slots 25b in superimposed stop plates 48—49 having threaded bolts 50 projected therethrough for fastening said plates to base plate 1, permit slidable positioning of said stop plates so that the respective upstanding flanges thereof will be respectively disposed in the paths of brackets 12—29a to serve as adjustable stops therefor.

An angular wire spring member 44 having an intermediate coil surrounding shaft 10a adjacent bearing block 11a normally urges bracket 29a in a counterclockwise direction (viewed from Figure 7) against the stop 48. One end of spring 44 engages the base of bracket 29a while the opposite end presses against a suitable stop, such as pin 45 projecting vertically for a short distance above base plate 1. In consequence thereof, frusto-conical abrasive rollers 21—32 respectively supported for rotation on threaded shafts or rods 21a—28a, in turn journalled in pivotal bearing brackets 16—29a, will be disposed one in advance of the other with the lower portions thereof in yieldable contact to provide an abrasive path of travel for the reciprocally moving knife K passing therebetween.

The structural modifications described above contemplates the substitution of a gear chain actuating mechanism for the pulley and gear arrangement illustrated in the preferred embodiment of the present invention. To this end, a chain of gears 40—41—42—43 are provided in place of the pulley and belt mechanism 33—34—35. Spur gear 40 fixedly mounted on shaft 10a for meshing engagement with idling pinion 41 which in turn engages identical idling pinion 42. Pinions 41—42 are rotatably mounted on respective shafts 41a—42a journalled in the base of bracket 29a and bracket arm 46 attached to bracket 29a with suitable fasteners such as screws 47.

Pinion 42, in turn, meshes with gear 43 mounted on shaft 28a. Thus it is apparent that the insertion of a knife blade K between leather encased guide rollers 7—8 and the frictional engagement of said knife therewith will cause said rollers to rotate in directions indicated by arrows in Figure 8. Through the actuating gears described supra, abrasive rollers 21—32 will be simultaneously rotated at a higher rate of speed in opposite directions, which is desirable for effecting grinding of the knife blade manually reciprocated therebetween.

The clamping mechanism may be modified by omitting a handle member and directly fastening the clamp arm 3b with threaded bolts 39b to the underside of base plate 1 so that vertical thumb screw 37a which is threadedly projected upwards through said clamp arm will rigidly engage the edge of a table or other support. With the teachings of the present invention, an efficient, durable and inexpensive knife grinding machine is provided for effective utility as a necessary household and commercial appliance.

Various changes may be made in the embodiment of the invention herein specifically described without departing from the invention or sacrificing any of the advantages or features thereof, and nothing herein shall be construed as limitations of the invention, its concept or structural embodiment as to the whole or any part thereof except as defined in the appended claims.

I claim:

1. In a knife grinding machine, the combination with a frame, of cylindrical guide means rotatively journalled in confronting relation on said frame, frusto-conical grinding means rotatively supported in the path of said guide means, means for normally urging said grinding means across the path of a blade displaceable between said guide means for cooperative engagement with said grinding means, and actuating means responsive to the blade displacement between said guide means for rotating said grinding means in an opposite direction to said guide means.

2. In a knife grinding machine, the combination with a frame, a pair of cylindrical guide means rotatively journalled in confronting relation on said frame, means for maintaining said guide means in yieldable frictional contact, a pair of frusto-conical grinding means rotatively supported in the path of said guide means, spring means for normally urging said grinding means across the path of a blade displaceable between said guide means for cooperative engagement with said grinding means, and actuating means responsive to the blade displacement between said guide means for rotating said grinding means in an opposite direction to said guide means.

3. In a knife grinding machine, the combination with a frame, a pair of cylindrical guide means rotatively journalled in confronting relation on said frame, means for maintaining said guide means in yieldable frictional contact, a pair of frusto-conical grinding means rotatively supported in the path of said guide means, spring means for normally urging said grinding means across the path of a blade displaceable between said guide means for cooperative engagement with said grinding means, and gear means interengaging one of said guide means with one of said grinding means for rotating said grinding means opposite to the rotation of said inter-engaged guide means.

ANDREW IVANCIN.